United States Patent Office 3,449,500
Patented June 10, 1969

3,449,500
TREATMENT OF CARDIAC ARRHYTHMIAS WITH PHARMACEUTICAL COMPOSITIONS CONTAINING N-[(2-IMIDAZOLIN-2-YL)-METHYL]-IMINO-DIBENZYL OR SALTS THEREOF
Lincoln Harvey Werner, Summit, and Walter Edward Barrett, New Vernon, N.J., assignors to Ciba Corporation, New York, N.Y., a corporation of Delaware
No Drawing. Continuation-in-part of application Ser. No. 288,602, June 18, 1963. This application June 3, 1966, Ser. No. 557,596
Int. Cl. A61k 27/00
U.S. Cl. 424—273     6 Claims

ABSTRACT OF THE DISCLOSURE

This invention is concerned with compositions for the treatment of cardiac irregularities, particularly cardiac arrhythmia, which compositions consist essentially of N-[(2-imidazolin-2-yl)-methyl]-iminodibenzyl or a pharmaceutically acceptable acid addition salt thereof together with a carrier.

---

This application is a continuation-in-part of our copending application Ser. No. 288,602, filed June 18, 1963, and now abandoned.

The present invention concerns a novel method for the treatment of cardiac irregularities, as well as pharmaceutical compositions useful in the treatment of cardiac irregularities, particularly cardiac arrhythmia, such as auricular or ventricular arrhythmia and the like.

We have now found a new method for the treatment of cardiac irregularities, which comprises administering to a subject, such as a warm-blooded animal, requiring relief from cardiac irregularities a composition consisting essentially of a pharmacologically effective amount of N-[(2-imidazolin-2-yl)-methyl]-iminodibenzyl or 5-[(2-imidazolin-2-yl)-methyl]-10,11-dihydrodibenz[b,f]azepine of the formula

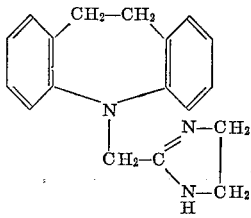

or especially a pharmaceutically acceptable acid addition salt thereof, as the active antifibrillatory ingredient, together with a pharmaceuticually acceptable carrier.

Pharmaceutically acceptable acid addition salts of the above N-[(2-imidazolin-2-yl)-methyl]-iminodibenzyl are those with inorganic acids, e.g. hydrochloric, hydrobromic, sulfuric, phosphoric acids and the like, or with organic acids, such as organic carboxylic acids, e.g. acetic, propionic, glycolic, succinic, maleic, fumaric, malic, tartaric, citric, benzoic, salicylic, 2-acetoxy-benzoic, nicotinic, isonicotinic acid and the like, or organic sulfonic acids, e.g. methane sulfonic, ethane sulfonic, ethane 1,2-disulfonic, 2-hydroxyethane sulfonic, p-toluene sulfonic acid and the like.

A preferred method for the treatment of cardiac irregularities comprises administering to a warm-blooded animal, such as a dog or cat, requiring relief from cardiac irregularities a composition consisting essentially of a pharmacologically effective amount of a pharmaceutically acceptable acid addition salt of N-[(2-imidazolin-2-yl)-methyl]-iminodibenzyl, such as the N-[(2-imidazolin-2-yl)-methyl]-iminodibenzyl hydrochloride, as the active antifibrillatory ingredient, together with a pharmaceutically acceptable carrier. A dose of 7.5 mg./kg. has been found to be effective when administered parenterally to the cat.

We have found that the N-[(2-imidazolin-2-yl)-methyl]-iminodibenzyl or a pharmaceutically acceptable acid addition salt thereof, has strong antifibrillatory effects of prolonged duration. In pharmacological tests, it can be shown that the above compound or a pharmaceutically acceptable acid addition salt, such as the hydrochloride, thereof offers an unusually prolonged protection against aconitine-induced cardiac fibrillation at low doses.

Also included within the scope of this invention are the novel pharmaceutical compositions consisting essentially of a pharmacologically effective amount of N-[(2-imidazolin-2-yl)-methyl]-iminodibenzyl or especially a pharmaceutically acceptable acid addition salt thereof, as the active antifibrillatory ingredient, together with a pharmaceutically acceptable carrier.

Preferred compositions for the treatment of cardiac irregularities are those consisting essentially of a pharmacologically effective amount of a pharmaceutically acceptable acid addition salt of N-[(2-imidazolin-2-yl)-methyl]-iminodibenzyl, such as the N-[(2-imidazolin-2-yl)-methyl]-iminodibenzyl hydrochloride, as the active antifibrillatory ingredient, together with a pharmaceutically acceptable carrier.

The compositions of this invention are generally prepared according to methods used in the art of manufacturing pharmaceutical compositions, essentially by combining specified proportions of the pharmacologically active ingredient with a pharmaceutically acceptable organic or inorganic carrier. Usually, the compositions of this invention contain at most equal amounts of the active ingredient and the inert carrier; preferably, they are made up to have from about 1 percent to at most 50 percent by weight of the pharmacologically active ingredient in the composition. In compositions for oral use (e.g. tablets, capsules and the like), the percentage by weight is from about 5 percent to at most 50 percent of active antifibrillatory ingredient. In compositions prepared for injection (e.g. solutions and the like), the percentage by weight is from about 1 percent to about 20 percent of the active antifibrillatory ingredient.

In preparing pharmaceutically acceptable dosage unit forms, any one of a wide variety of preparations may be manufactured, such as tablets, capsules, pills, suppositories, solutions, suspensions and the like. In addition to the pharmacologically active component, there may be present additional substances commonly employed in the art of manufacturing pharmaceutically acceptable dosage unit compositions. These may include excipients, binders, fillers, lubricants, solvents, stabilizers, wetting agents, emulsifiers, buffers, and/or other inert ingredients.

The tablet, capsule, dragee and the like provide for the oral form of administration. These forms may be compounded to have from about 0.02 g. to about 0.15 g., especially from about 0.025 g. to about 0.1 g., of N-[(2-imidazolin-2-yl)-methyl]-iminodibenzyl or especially a pharmaceutically acceptable acid addition salt thereof, such as the N-[(2-imidazolin-2-yl)-methyl]-iminodibenzyl hydrochloride, as the active antifibrillatory ingredient, per single dosage unit, together with a pharmaceutically acceptable carrier.

The inert fillers, binders, lubricants and other materials normally used for the manufacture of the orally applicable pharmaceutical compositions, e.g. tablets, capsules, dragees and the like, are employed in their formulation. Examples of these materials are starches, e.g. corn starch, wheat starch and the like, sugars, e.g. lactose, sucrose and the like, stearic acid, magnesium stearate, calcium stearate, aluminum magnesium silicate preparations (colloidal silica preparations), talc, tragacanth, acacia, polyethylene glycol and the like. The quantities of these ingredients can vary widely and depend upon the characteristics and the size of the desired, orally applicable dosage unit form, the method of its manufacture and the like. Encapsulation may be effected, using the same excipients as those employed for the preparation of other orally applicable forms, e.g., tablets. Any compatible colors, approved and certified under the provisions of the Federal Food, Drug and Cosmetic Law may be used as a means of identification and the like.

Solutions for parenteral administration have from about 0.02 g./ml. to about 0.15 g./ml., preferably from about 0.025 g./ml. to about 0.1 g./ml., of N-[(2-imidazolin-2-yl)methyl]-iminodibenzyl or especially a pharmaceutically acceptable acid addition salt thereof, such as the N-[(2-imidazolin-2-yl)-methyl]-iminodibenzyl hydrochloride, as the active antifibrillatory ingredient, together with a pharmaceutically acceptable carrier.

Primary solvents of the solutions for injection according to this invention are water, water-miscible organic solvents, such as lower alkanols, e.g. ethanol and the like, or mixtures of water and water-miscible organic solvents, such as lower alkanols, e.g. ethanol and the like. Other ingredients are added to ensure stable solutions for injection, for example, stabilizers, such as anti-oxidants, e.g. thiourea, sodium sulfide, sodium metabisulfite, ascorbic acid, cysteine hydrochloride, sodium formaldehyde sulfoxylate, mono-thioglycerol, thiosorbitol and the like, solubilizers, e.g. N,N-diethylacetamide, polyethyleneglycol, ureas, urethanes and the like, buffers and buffer combinations to maintain a preferable pH of about 7, such as, for example, acetic acid, potassium phthalate and sodium hydroxide, potassium dihydrogen phosphate and di-sodium hydrogen phosphate, potassium dihydrogen phosphate and sodium hydroxide, acetic acid and sodium acetate, and the like, salts for making isotonic solutions, e.g. sodium chloride and the like, or any other suitable auxiliary substances.

The following working examples are illustrative of the invention, but are in no way intended to limit the scope of the present invention.

EXAMPLE 1

Tablets, each containing 0.05 g. of N-[(2-imidazolin-2-yl)-methyl]-iminodibenzyl hydrochloride are prepared as follows (for 500,000 tablets):

| Ingredients: | G. |
|---|---|
| N-[(2-imidazolin-2-yl)methyl]-iminodibenzyl hyrochloride | 25,000.0 |
| Lactose S.D. | 106,845.0 |
| Corn starch | 3,850.0 |
| Corn starch (for paste) | 2,860.0 |
| Confectioners sugar | 10,000.0 |
| Stearic acid | 1,445.0 |
| Purified water, q.s. | |
| Alcohol anhydrous 3A, q.s. | |

The N-[(2-imidazolin-2-yl)-methyl]-iminodibenzyl hydrochloride is mixed with an equal portion of lactose; the mixture is passed through a No. 16 screen on a Fitzmill at medium speed and placed into a mixer. The remainder of the lactose, the 3.850.0 g. of corn starch, the confectioners sugar and the stearic acid are added, and the powder is mixed for twenty minutes. The 2,860.0 g. of corn starch is suspended in cold water and a paste is formed by diluting the mixture with 14,000 ml. of boiling water. The paste is then added to the dry powder mixture to form the granulate; granulation is completed by adding 1,000 ml. of a 1:1-mixture of the 3A alcohol and water. The wet mass is passed through a No. 5 screen on the Fitzmill at low speed, dried on trays at about 43° and then broken on a No. 12 screen. The granulate is compressed into tablets weighing 0.3 g., using $11/\!\!/_{32}$ inch dies and standard concave punches.

EXAMPLE 2

Capsules, each containing 0.03 g. N-[(2-imidazolin-2-yl)-methyl]-iminodibenzyl hydrochloride are prepared as follows (for 40,000 capsules):

| Ingredients: | G. |
|---|---|
| N-[(2-imidazolin-2-yl)-methyl]-iminodibenzyl hydrochloride | 1,200.0 |
| Corn starch | 700.0 |
| Magnesium stearate | 105.0 |
| Lactose | 11,995.0 |

All ingredients are thoroughly mixed; the mixture is passed through a No. 30 screen again mixed for an additional thirty minutes and then filled on an encapsulating machine into No. 2 clear, hard gelatine capsules, each containing 0.35 g. of material.

EXAMPLE 3

Tablets, each containing 0.025 g. of N-[(2-imidazolin-2-yl)-methyl]-iminodibenzyl hydrochloride, are prepared as follows (for 1,000 tablets):

| Ingredients: | G. |
|---|---|
| N-[(2-imidazolin-2-yl)-methyl]-iminodibenzyl hydrochloride | 25.00 |
| Tragacanth | 5.00 |
| Lactose | 97.50 |
| Talcum | 7.50 |
| Corn starch | 12.50 |
| Stearic acid | 1.25 |
| Magnesium stearate | 1.25 |

The N-[(2-imidazolin-2-yl)-methyl]-iminodibenzyl hydrochloride is passed through a No. 30 screen, mixed with the tragacanth and lactose in a mixing machine and granulated with water. The granules are dried at 25°, passed through a No. 16 screen and mixed with the talcum, corn starch, stearic acid and magnesium stearate. The mix is compressed into tablets, each weighing 0.15 g., using $11/\!\!/_{32}$ inch standard concave punches.

EXAMPLE 4

Capsules, each containing 0.05 g. of N-[(2-imidazolin-2-yl)-methyl]-iminodibenzyl hydrochloride each, are prepared as follows (for 2,000 capsules):

| Ingredients: | G. |
|---|---|
| N-[(2-imidazolin-2-yl)-methyl]-iminodibenzyl hydrochloride | 100.00 |
| Lactose USP | 560.00 |

The N-[(2-imidazolin-2-yl)-methyl]-iminobenzyl hydrochloride and the lactose are passed through a No. 20 sieve and mixed for twenty minutes in a mixing machine. The mixture is filled into No. 1 capsules, each containing 0.33 g. of material.

EXAMPLE 5

A solution for injection containing per ml. 0.02 g. of N-[(2-imidazolin-2-yl)-methyl]-iminodibenzyl hydrochloride is prepared as follows (for 1,000 ml.):

| Ingredients: | | |
|---|---|---|
| N-[(2-imidazolin-2-yl)-methyl]-iminodibenzyl hydrochloride | g | 20.00 |
| Sodium chloride | g | 7.07 |
| Water for injection q.s. | ml | 1000.00 |

The N-[(2-imidazolin-2-yl)-methyl]-iminodibenzyl hydrochloride is dissolved in 950 ml. of water for injection, the solution is heated to 40°, and the sodium chloride is added. The solution is cooled to 25°, and the volume is brought to 1000.00 ml. by adding the necessary amount of water. Throughout the procedure aseptic techniques are used, and the solution is filtered through a sterile filter into a 2,000 ml. flask, and 2.2 ml. of the solution is filled into 2 ml. amber ampules which are sealed and inspected.

EXAMPLE 6

Tablets, each containing 0.025 g. of N-[(2-imidazolin-2-yl)-methyl]-iminodibenzyl hydrochloride are prepared as follows (for 800,000 tablets):

| Ingredients: | G. |
|---|---|
| N - [(2-imidazolin-2-yl)-methyl]-iminodibenzyl hydrochloride | 20,000.0 |
| Lactose USP | 143,495.0 |
| Corn starch | [1] 17,050.0 |
| Confectioners sugar | 14,000.0 |
| Colloidal silica | 5,000.0 |
| Stearic acid powder USP | 2,000.0 |
| Calcium stearate | 500.0 |
| Color FD&C Yellow No. 5 | 5.0 |
| Purified water q.s. | |

[1] Equivalent to 15,000.0 g. on an anhydrous basis.

The N-[(2-imidazolin-2-yl)-methyl]-iminodibenzyl hydrochloride, the lactose, 12,500.0 g. of the corn starch, the confectioners sugar and the colloidal silica are passed through a No. 16 screen into a mixer and blended at low speed for twenty minutes. The remainder of the corn starch is suspended in a cold solution of the color FD&C Yellow No. 5 in 5,000 ml. of purified water, and a paste is formed by gradually adding 20,000 ml. of boiling purified water. The mixed powders are granulated with the above paste, using additional water as required.

The resulting moist mass is passed through a mill, using a No. 4A screen, placed on trays and dried at 38° C. until the moisture content is between 2 percent and 3 percent. The granules are broken on a mill through a No. 16 wire mesh screen, and treated with the stearic acid and the calcium stearate, both screened through a No. 20 mesh screen. After mixing for twenty minutes, the granulation is compressed into tablets, each weighing 0.25 g., using $11/_{32}$ inch dies, standard concave punches, uppers bisected, lowers monogrammed.

In the above example, the N-[(2-imidazolin-2-yl)-methyl]-iminodibenzyl hydrochloride may be replaced by any other pharmaceutically acceptable acid addition salt of the N - [(2 - imidazolin-2-yl)-methyl]-iminodibenzyl, such as the sulfate, maleate, tartrate, methane sulfonate, ethane 1,2-disulfonate and the like, thereof.

EXAMPLE 7

Tablets, each containing 0.03 g. of N-[(2-imidazolin-2-yl)-methyl]-iminodibenzyl are prepared as follows (for 100,000 tablets):

| Ingredients: | G. |
|---|---|
| N - [2 - imidazolin-2-yl)-methyl]-iminodibenzyl hydrochloride | 3,000.000 |
| Lactose USP | 17,436.875 |
| Corn starch | [2] 2,131.250 |
| Confectioners sugar | 1,750.000 |
| Colloidal silica | 625.000 |
| Stearic acid powder USP | 250.000 |
| Calcium stearate | 62.500 |
| Color FD&C Yellow No. 5 | 0.625 |
| Purified water q.s. | |

[2] Equivalent to 1,875.000 g. on an anhydrous basis.

The tablets, each weighing 0.250 g., are prepared according to the procedure described in Example 6.

EXAMPLE 8

Capsules containing 0.025 g. each of N-[(2-imidazolin-2-yl)-methyl]-iminodibenzyl hydrochloride are prepared as follows (for 900 capsules):

| Ingredients: | G. |
|---|---|
| N-[(2 - imidazolin - 2 - yl)-methyl]-iminodibenzyl hydrochloride | 22.50 |
| Lactose USP | 139.50 |

The ingredients are blended in a suitable mixer, sieved through a No. 40 screen and again mixed; portions weighing 0.18 g. each, of the resulting mixture are filled into No. 4 capsules.

In the above capsules, the N-[(2-imidazolin-2-yl)-methyl]-iminodibenzyl hydrochloride may be replaced by any other pharmaceutically acceptable acid addition salt of N - [(2-imidazolin-2-yl)-methyl]-iminodibenzyl, such as the sulfate, maleate, tartrate, methane sulfonate and the like, thereof.

The compund used as the active ingredient in the above compositions is prepared as follows (temperatures are given in degrees centigrade): A mixture of 9.6 g. of iminodibenzyl and 5.2 g. of 2-chloromethyl-2-imidazoline hydrochloride is heated to 135–140° for six hours while stirring. After cooling to 100° 20 ml. of water is added, and the mixture is heated to reflux; the supernatant solution is decanted from the insoluble material. This step is repeated twice using portions of 10 ml. of water. The combined water extracts are cooled whereupon the N-[(2-imidazolin-2-yl-methyl]-iminodibenzyl hydrochloride precipitates; it melts at 270–272° after recrystallization from a mixture of ethanol and ethyl acetate.

What is claimed is:

1. A method for the treatment of cardiac arrhythmia which comprises orally administering to a host who required such a pharmaceutical composition having (1) as the active antifibrillatory ingredient from about 0.02 g. to about 0.15 g. of a member selected from the group consisting of N - [(2 - imidazolin-2-yl)-methyl]-iminodibenzyl and a pharmaceutically acceptable acid addition salt thereof, and (2) a pharmaceutically acceptable carrier per single dosage unit.

2. A method of claim 1, in which the said active antifibrillatory ingredient is in the form of a pharmaceutically acceptable acid addition salt.

3. A method of claim 2, in which the said active antifibrillatory ingredient is in the form of the hydrochloride.

4. A method for the treatment of cardiac arrhythmia which comprises parenterally administering to a host who required such a solution containing (1) from about 0.02 g./ml. to about 0.15 g./ml. of a member selected from the group consisting of N-[(2-imidazolin-2-yl)-methyl]-iminodibenzyl and a pharmaceutically acceptable acid addition salt thereof, as the active antifibrillatory ingredient, and (2) a pharmaceutically acceptable carrier.

5. A method of claim 4 for parenteral administration, in which the said active antifibrillatory ingredient is in the form of a pharmaceutically acceptable acid addition salt.

6. A method of claim 5 for parenteral administration, in which the said active antifibrillatory ingredient is in the form of the hydrochloride.

References Cited

Schindler et al. I Helvetica Chimica Acta. vol. 37, pp. 472–483 (1954).

Schindler et al. II Chemical Abstracts, vol. 49, Col. 6277–6279 (1955).

ALBERT T. MEYERS, Primary Examiner.

S. J. FRIEDMAN, Assistant Examiner.

U.S. Cl. X.R.

424—232, 266